United States Patent

Sulzbach et al.

[11] Patent Number: 6,071,616
[45] Date of Patent: Jun. 6, 2000

[54] OPAQUE LOW REFLECTING COATING APERTURE ON GLASS

[75] Inventors: Frank C. Sulzbach, Dallas; Ching-Tai Chen, Plano, both of Tex.

[73] Assignee: Texas Instruments Incorporated, Dallas, Tex.

[21] Appl. No.: 08/982,976

[22] Filed: Dec. 1, 1997

Related U.S. Application Data

[60] Provisional application No. 60/033,226, Dec. 5, 1996.

[51] Int. Cl.[7] .................................................. G02F 1/135
[52] U.S. Cl. ...................... 428/408; 359/237; 359/321; 359/585; 359/589; 428/426; 428/469; 428/472; 428/212; 428/701; 428/702
[58] Field of Search ..................... 428/408, 701, 428/702, 472, 469, 426, 212; 359/237, 321, 585, 589

[56] References Cited

U.S. PATENT DOCUMENTS

| | | | |
|---|---|---|---|
| 4,948,706 | 8/1990 | Sughara et al. ..................... | 430/311 |
| 5,148,298 | 9/1992 | Shigeta et al. ..................... | 359/72 |
| 5,237,436 | 8/1993 | Khan et al. ........................ | 359/59 |
| 5,471,331 | 11/1995 | Takizawa et al. ................. | 359/67 |
| 5,510,186 | 4/1996 | Sulzbach ........................... | 428/408 |
| 5,592,317 | 1/1997 | Fujikawa et al. .................. | 349/110 |
| 5,754,263 | 5/1998 | Akiyama et al. .................. | 349/110 |

FOREIGN PATENT DOCUMENTS

| | | |
|---|---|---|
| 0596733A1 | 5/1994 | European Pat. Off. . |
| 0736793A2 | 10/1996 | European Pat. Off. . |
| 2240204A | 7/1991 | United Kingdom . |
| WO9217812 | 10/1992 | WIPO . |

*Primary Examiner*—Archene Turner
*Attorney, Agent, or Firm*—Charles A. Brill; Frederick J. Telecky, Jr.; Richard L. Donaldson

[57] ABSTRACT

A glass surface with a low reflectance opaque aperture coating (12). In one example the coating has two layers, in another the coating has three layers. In a third example the coating includes a filter layer structure(36). The coating can be deposited onto the glass or an antireflective coating (14). A process is included in which the opaque coating is formed. The process includes depositing the coating on an antireflective coating, then patterning and etching the opaque coating to define a clear aperture area.

25 Claims, 2 Drawing Sheets

／6,071,616

OPAQUE LOW REFLECTING COATING APERTURE ON GLASS

CROSS REFERENCE TO RELATED APPLICATIONS

This application claims priority under 35 USC §119 of provisional application number 60/033,226 filed Dec. 5, 1996 pending.

BACKGROUND OF THE INVENTION

1. Field of the Invention

This invention relates to coatings on glass, more particularly to low reflectance coatings.

2. Background of the Invention

Many different types of devices receive and transmit light through glass. One type of these devices is spatial light modulators. These modulators include area array modulators, as well as opto-electronic or magneto-electronic modulators. Area array modulators typically consist of arrays of individual elements arranged in rows and columns, and are typically used in imaging applications, such as displays and printers. They are illuminated with a source light and modulate that light into an image.

Each individual element on the device typically corresponds to a picture element (pixel) in the produced image. These arrays receive light through the glass and then selected elements transmit light to the display surface. The selection of which transmit light (white) and which do not (black) forms the image. Several sophisticated techniques, such as pulse width modulation for gray scale and field sequential color, can be applied to produce color images. These modulators have several advantages, not the least of which is the ability to control each individual dot on the image.

In order for these arrays to function effectively, stray light in the system must be controlled. Light is constrained to the active area of the array by an opaque coating that prevents source light from striking any part of the device other than the elements. This prevents any reflection from other parts of the device which may cause artifacts in the image. In current embodiments, the glass was assumed to need high reflectance. Light from a source outside the package striking the opaque coating would be reflected. Unfortunately, this high reflectance has been found to cause ghost images around the edge of the image projected by the array. One method of preventing this type of reflectance would require the opaque aperture coating to absorb light.

However, if the opaque coating absorbs too much light, it overheats the package as well. Therefore, a coating is needed that defines the optical aperture with low reflectance from the outside of the package and that does not heat the package beyond its limits.

SUMMARY OF THE INVENTION

One aspect of the invention is a low reflecting opaque coating for glass surfaces. In one embodiment the coating is a three layer coating including a layer of germanium. The germanium is contained in titanium to control the interior chemical environment of closed packages. Another embodiment involves a two layer coating of yttrium oxide and germanium. A third embodiment uses a carbon film and a graphite layer, with or without a layer of yttrium oxide.

Another aspect of the invention is a process for depositing the coating in a combined two-step process. The antireflective coating is laid down first and then the low reflecting coating is laid down on top of it. The above embodiments of the coating can be used with current processes or with the new process.

It is an advantage of the invention to provide a low reflectance opaque coating for a glass surface.

It is a further advantage of the invention to allow a low cost implementation of the process of coating the glass.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
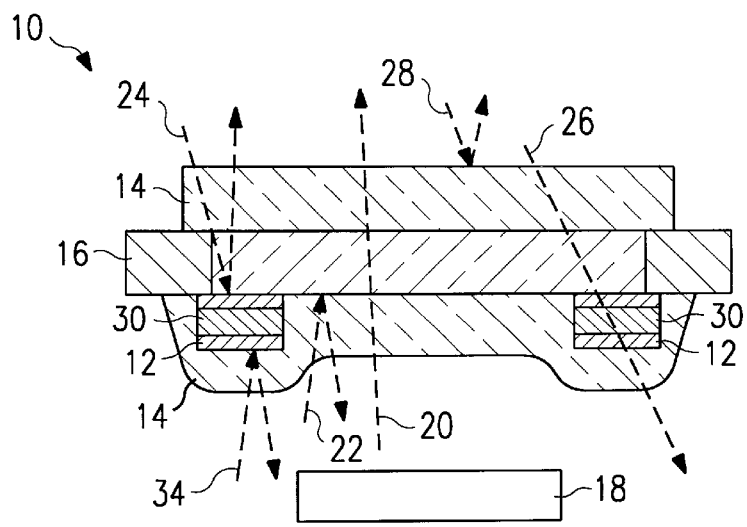
FIG. 1 shows a prior art embodiment of a glass surface with a low reflecting coating.

FIG. 1 shows a cross-sectional view of a prior art embodiment of a glass surfaced package 10 used in conjunction with a spatial light modulator array. The array 18 lies under the glass which is held by frame 16. The outside surface of the glass has an antireflective (AR) coating 14 which extends onto the frame 16. On the inner surface of the glass, the surface which faces the array, the AR coating covers the aperture coating 12. From the top view, the aperture coating 12 would appear to be a hollow frame of opaque material. The aperture coating 12 consists of a three layer structure, of which the middle layer 30 is silver.

The percentage of reflectance and transmittance at various surface interfaces is shown from the array side is shown by the arrows 20, 22, and 34. The clear area of the AR coatings and glass, shown by arrow 20, has a 99% transmittance. The reflectance of the interface between the glass and the coating, shown as arrow 22, has a 0.5% reflectance. This is the same from the source light side of the package as shown by arrow 28. The reflectance of the light from the array that impinges upon the aperture coating, shown by arrow 34, has a 20% reflectance. This type of reflectance may also cause artifacts in the image, since the array may use the light reflected off of the aperture coating to form pixels that were not intended to be formed.

The percentage of reflectance and transmittance from the source light side of the package is shown by arrows 24, 26 and arrow 28 discussed above. Arrow 26 shows the path of source light traveling through the aperture coating with a transmittance of 0.1%. Arrow 28 shows the reflectance off of the AR coating, which is typically 0.5%. Of these arrows, the reflections off the aperture coating, arrow 24 and arrow 34, from inside the package, are of the most interest. Therefore, arrows 20, 26, 28 and 22 have been eliminated from further discussion.

Arrow 24 shows the reflectance of source light off the aperture coating outside the package, which will be referred to as outside reflectance. In this case, there is a high reflectance in glass. This high reflectance had been thought to be desirable. However, this high reflectance is a source of the ghost images discussed previously. Therefore, it was necessary to develop a new coating to eliminate that problem.

Figure 2:
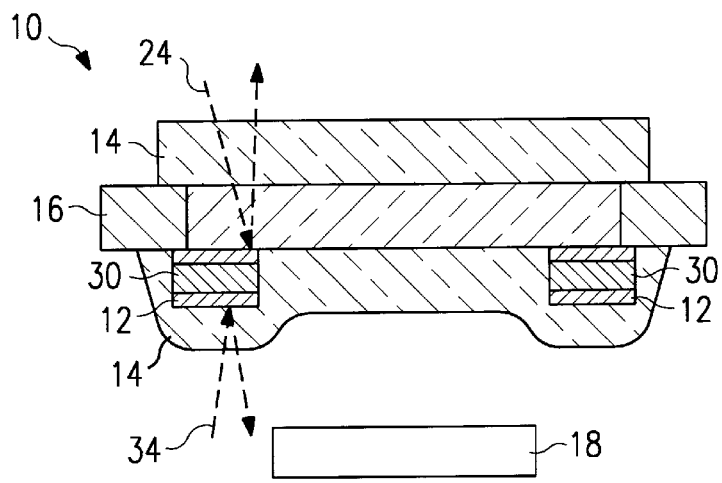
FIG. 2 shows one embodiment of a glass surface with a low reflecting coating.

One such coating is shown in FIG. 2. Structurally, the three layer coating looks much like the prior art embodiment of FIG. 1. In this instance, however, the middle layer is germanium. An example of these three layers includes a 60 nm thick layer of titanium monoxide against the glass, a middle layer 30 of germanium about 300 nm thick, and a final 150 nm thick layer of titanium. This final layer is optional. In some cases it may be necessary to cover the layer of germanium with a layer of metal to preserve the chemical environment of the package.

Figure 3:
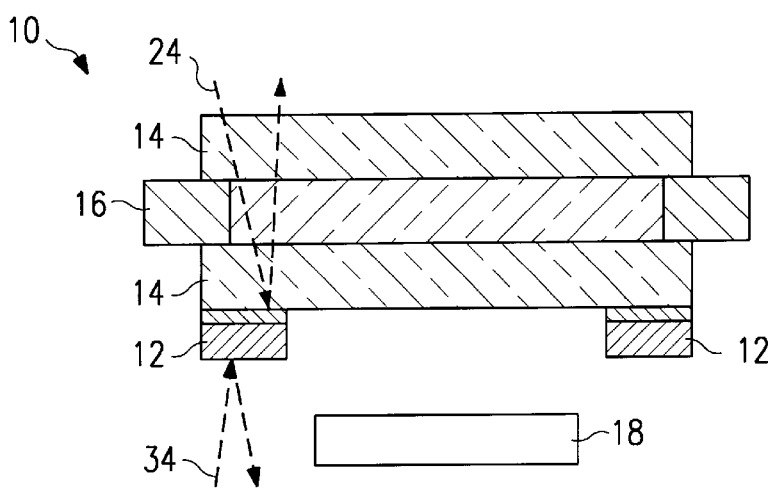
FIG. 3 shows a first alternative embodiment of a glass surface with a low reflecting coating.

This embodiment of a low reflecting, opaque aperture layer relies upon the germanium layer for absorption. Ideally, the reflectance should be less than 10%, while remaining opaque. The rise in temperature in the package should be limited to less than 12° C. It has been found that the reduction in photopic reflectance, which is that reflectance as seen by a human observer, should be less than 7% when a metal halide light source is used. Therefore, the range of the photopic reflectance for light shown by arrow 24 should be between 7%–10%. The radiometric reflectance of the metal halide light source energy should be greater than 8%. Radiometric reflectance is that which would be detected by a uniform detector, not just that detected by the human eye The embodiment of FIG. 2 uses the same process steps as that of prior art FIG. 1. In FIG. 3, the process has been changed which results in a cost reduction in manufacturing the window. In FIGS. 1 and 2, the aperture coating is laid down directly onto the glass. A mask of photoresist is formed over top of the glass to cover the intended clear area in the middle. The three layer opaque coating is deposited, then the surface is soaked and agitated to get rid of the unwanted coating and photoresist. This lift off process often results in defects which affect the performance of the device. Finally, the AR coating is laid down on top of the glass and aperture coating.

The coatings used in the embodiments of FIGS. 3–6 have a new process that reduces the number of steps and the amount of materials used. Both the AR coating and the opaque low reflector coating are deposited on the glass in one operation. Then the opaque low reflector coating is masked to expose the area in which the materials are to be removed. These materials are then plasma etched or wet chemical etched to remove the unwanted materials. The etch does not damage the AR coating. In this manner, the number of steps have been reduced, and the complications of the lift off process described above have been eliminated.

FIG. 3 shows coatings laid down in this manner. The coatings used here are deposited on top of the AR coating. In this embodiment they are a two layer structure of yttrium oxide and germanium. The yttrium oxide is laid down against the AR coating, then the germanium layer on top of it. In one embodiment, the yttrium oxide layer is 60 nm thick and the germanium layer is 300 nm thick. After patterning the areas to be kept with photoresist, the unwanted germanium is etched. One example of an etching process is to use a hydrogen peroxide solution. The unwanted yttrium oxide etches in any weak acid, such as acetic acid (vinegar).

This embodiment of the coatings has the desired range of outside reflectance at arrow 24, and the reflectance off the aperture coating shown as arrow 34 of 45%. The reflectance from inside the package off the aperture coating will be referred to as the inside reflectance. It is possible that the 45% inside reflectance will be undesirable.

Another embodiment of the aperture coating uses a nearly transparent 50 nm film of carbon, which has an index of refraction of 2.2-i0.5. This is followed by a 500 nm layer of hard graphite with an index of about 3.0-i0.3. The first layer is deposited by dissociating a hydrocarbon gas such as ethylene. The second layer is deposited by an electron beam gun with RF-excited argon plasma. Nearly all of the light is absorbed in the hard graphite layer, and both layers can be easily etched in an oxygen RF plasma. This coating has an inside reflectance of 25% and the appropriate range of outside reflectance.

A variation on this coating uses a layer of carbon 1100 nm thick. This can be deposited by using ethylene, with deposition parameters such as bias voltage, gas pressure, current, and gas flow, chosen to increase light absorption. The values are dependent on the specific coating chamber. 1100 nm of absorbing carbon transmits slightly at wavelengths longer than 550 nm. An increase in thickness will make the coating adequately opaque. However, its outside reflectance may be too low when considering the accompanying rise in package temperature due to absorption.

Figure 4:
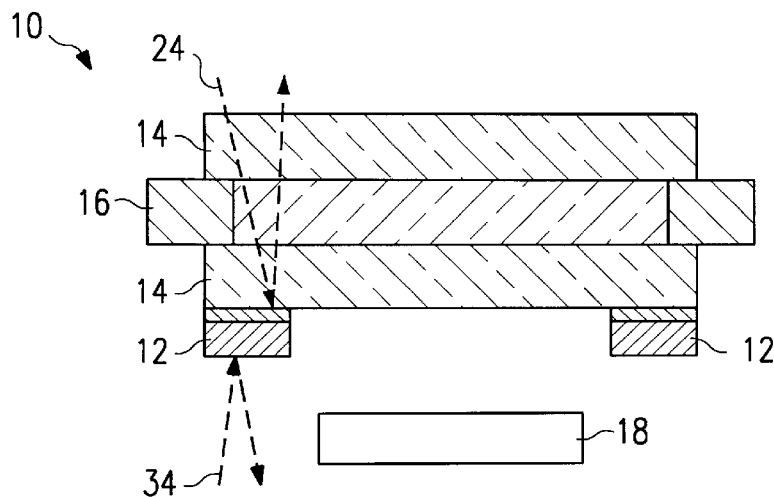
FIG. 4 shows a second alternative embodiment of a glass surface with a low reflecting coating.
Figure 5:
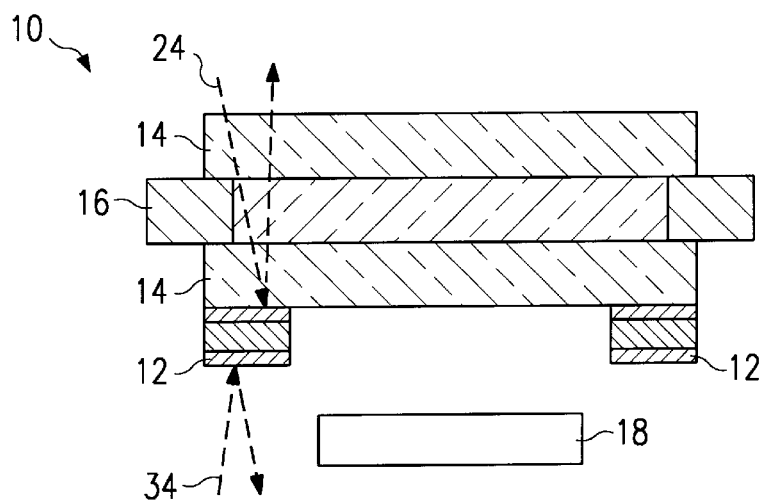
FIG. 5 shows a third alternative embodiment of a glass surface with a low reflecting coating.

While the inside reflectance along the path 34 in the embodiment of FIG. 4 was an improvement to 25% from the reflectance of 45% from FIG. 3, it may still be undesirably high. A possible solution to this is shown in FIG. 5. In the two step process, adding a third layer of yttrium oxide reduces the inside reflectance to 5%, while keeping the outside reflectance along path 34 in the desired ranges.

As mentioned above, the photopic reflectance is that reflectance of the specified light source distribution which can be seen by the human eye. The total reflectance, or radiometric reflectance, is the reflectance of the specified light source as seen by a uniform detector. It is possible to increase the radiometric reflectance to reduce the temperature rise of the device without increasing the photopic reflectance. This can be accomplished in several ways.

In one example, a layer can be deposited between the AR coating and the 2 or 3 layer opaque aperture coating. The thickness of this new layer can be adjusted to be optically a half wavelength thick at about 540 nm. One such layer could be a 120 nm thick layer of yttrium oxide. It would have little effect on the photopic reflectance, but would double the radiometric reflectance. Therefore, only about one half as much incident light would be absorbed and the temperature rise would also be halved. As mentioned above with regard to yttrium oxide, it can be easily etched.

More complicated examples would involve multilayer structures. The risk of damage or defects increases when using more layers. Overetching into the AR coating is a possibility when using Reactive Ion Etching (RIE) but monitoring the thickness removed with an optical film thickness monitor minimizes this risk. Optical film thickness monitors are used routinely in the deposition of films. This device can therefore be used to control the progress of coating removal to define the clear aperture area.

Figure 6:
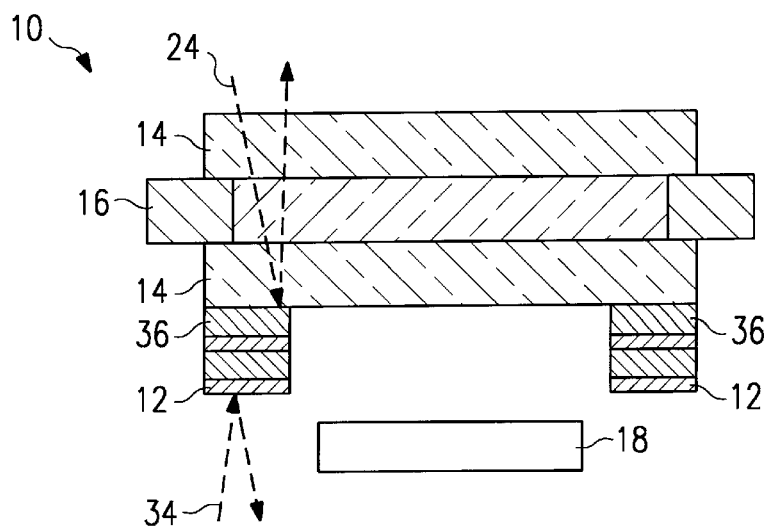
FIG. 6 shows a fourth alternative embodiment of a glass surface with a low reflecting coating.

An example of one of these multilayer structures is shown in FIG. 6. The filter layers 36 are shown added to a three layer opaque reflector, but could also be added to a two layer structure. The filter layers 36 could be one of several material sets, among which are titanium dioxide, silicon dioxide and titanium dioxide with optical thicknesses at one, two and one quarter wave at 550 nm. The radiometric reflectance would be increased by a factor of four. This coating, like any of the coatings used in FIGS. 3–6, could be laid down using current techniques, or the two step process described above. More complicated structures with more layers can further increase the radiometric reflectance without substantially increasing the photopic reflectance.

In the above embodiments, a low reflectance opaque aperture coating on a glass surface is provided that eliminates ghost images caused by the previously desired high reflectance coating on glass. The glass surface could be the transmissive surface for a self-contained package, as described above. However, this package is intended as an example only. The glass surface could be used by a transmissive modulator, where the treated glass surface would not have the second surface coated with an AR coating. The glass surface could be used with any modulator that needs an opaque aperture coating to define the clear aperture for projection of light.

Thus, although there has been described to this point a particular embodiment for a method and structure for a low reflectance opaque coating, it is not intended that such specific references be considered as limitations upon the scope of this invention except in-so-far as set forth in the following claims.

What is claimed is:

1. A glass surface used with a spatial light modulator array operable to transmit light, comprised of:
   an antireflective coating on at least one side of a glass surface;
   an opaque coating on said antireflective coating, said opaque coating having at least two layers and a photopic reflectance of less than 10%.

2. The surface of claim 1 wherein said opaque coating comprises three layers.

3. The surface of claim 2 wherein said three layers include an yttrium oxide layer on said antireflective coating, a graphite layer on said yttrium oxide layer and a carbon layer on said graphite layer.

4. The surface of claim 1 wherein said opaque coating includes a filter layer on said antireflective coating.

5. The surface of claim 4 wherein said filter layer includes a first titanium dioxide layer on said antireflective coating, a silicon dioxide layer on said first titanium dioxide layer, and a second titanium dioxide layer on said silicon dioxide layer.

6. The surface of claim 2 wherein said three layers include a titanium monoxide layer on said antireflective coating, a germanium layer on said titanium monoxide layer and a titanium layer on said germanium layer.

7. The surface of claim 1 wherein said opaque coating comprises two layers.

8. The surface of claim 7 wherein said two layers include an yttrium oxide layer on said antireflective coating, and a germanium layer on said yttrium oxide layer.

9. The surface of claim 7 wherein said two layers include a carbon layer on said antireflective coating and a graphite layer on said carbon layer.

10. An apparatus comprising:
    a first layer made of a material having a high transmittance for light, said first layer having first and second portions; and
    a second layer disposed on a first side of said first layer in alignment with said second portion of said first layer, said second layer being opaque and having a radiometric reflectance which is greater than a predetermined percentage for radiation impinging on said second layer in a direction from a second side of said first layer opposite from said first side thereof.

11. An apparatus according to claim 10, wherein said predetermined percentage is 8%.

12. An apparatus according to claim 10, wherein said second layer has a photopic reflectance which is less than a predetermined percentage for the radiation impinging on said second layer in said direction.

13. An apparatus according to claim 12, wherein said predetermined percentage for said photopic reflectance is 10%.

14. An apparatus according to claim 13, wherein said predetermined percentage for said radiometric reflectance is 8%.

15. An apparatus according to claim 12, wherein said second layer includes a titanium monoxide layer on a side thereof nearest said first layer, a germanium layer on said titanium monoxide layer, and a titanium layer on said germanium layer.

16. An apparatus according to claim 12, wherein said second layer includes an yttrium oxide layer on a side thereof nearest said first layer, and a germanium layer on said yttrium oxide layer.

17. An apparatus according to claim 12, wherein said second layer includes a carbon layer on a side thereof nearest said first layer, and a hard graphite layer on said carbon layer.

18. An apparatus according to claim 12, wherein said second layer includes a carbon layer.

19. An apparatus according to claim 12, including a filter layer disposed between said second layer and said second portion of said first layer.

20. An apparatus according to claim 19, wherein said filter layer includes a titanium dioxide layer on a side thereof nearest said first layer, a silicon dioxide layer on said titanium dioxide layer, and a further titanium dioxide layer on said silicon layer.

21. An apparatus according to claim 10, wherein said second layer has a low reflectance for radiation impinging on said second layer in a direction from a side thereof opposite from said first layer.

22. An apparatus according to claim 10, wherein said first layer is made of a glass material, and wherein said second layer and said second portion of said first layer extend around said first portion of said first layer.

23. An apparatus according to claim 10, including an antireflective coating disposed on said first side of said first layer, said second layer being disposed on a side of said coating remote from said first layer.

24. An apparatus according to claim 10, including an antireflective coating disposed on said first side of said first layer, said second layer being disposed between said coating and said second portion of said first layer.

25. An apparatus according to claim 10, including a spatial light modulator array which is spaced from said first and second layers and which is disposed on a side of said second layer remote from said first layer, wherein light traveling in said direction can pass through said first portion of said first layer and reach said array.

* * * * *